May 2, 1939.  I. I. SIKORSKY  2,156,773
RETRACTABLE LANDING GEAR
Filed May 14, 1936  2 Sheets-Sheet 1
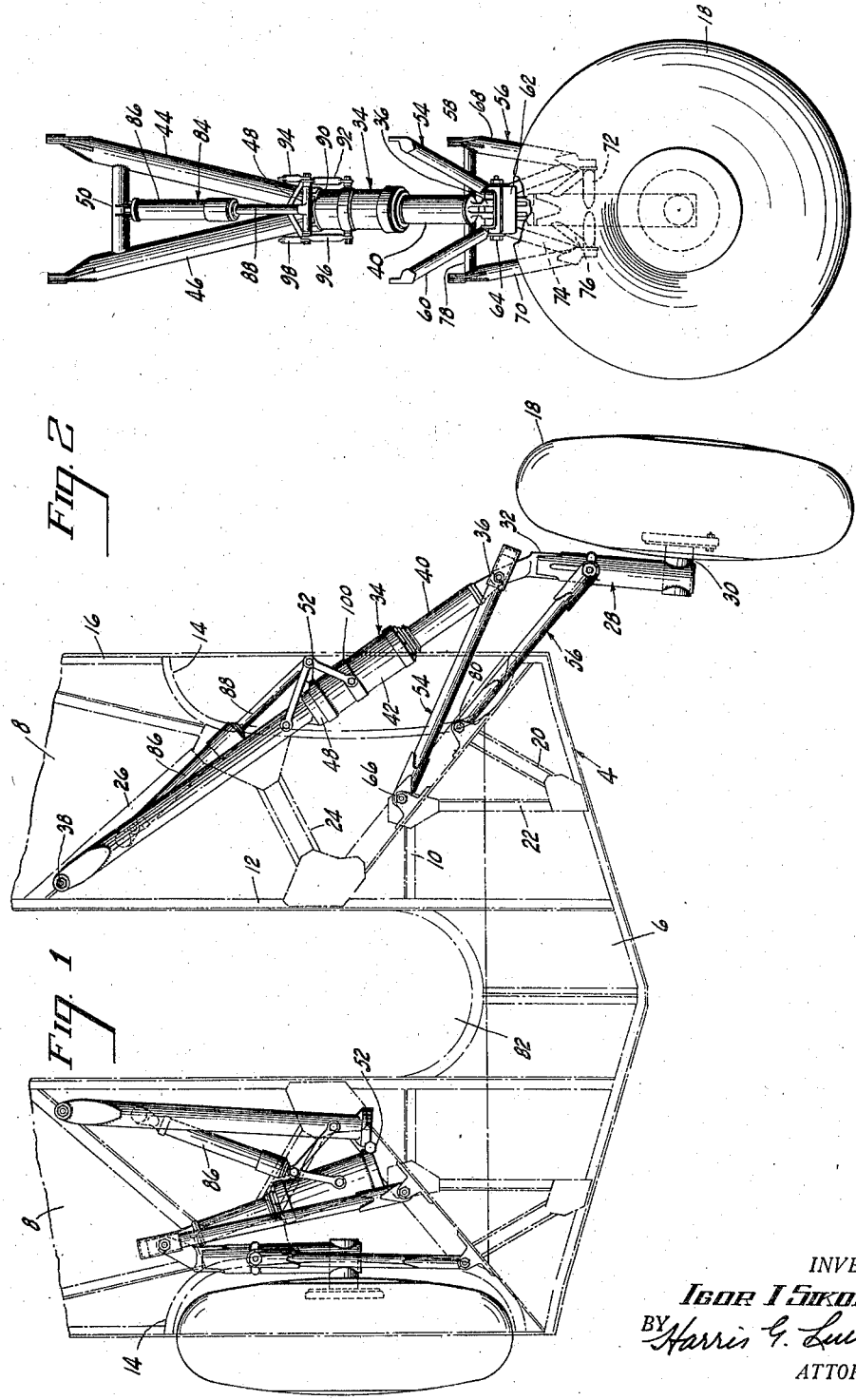
INVENTOR.
*Igor I Sikorsky*
BY *Harris G. Luther*
ATTORNEY

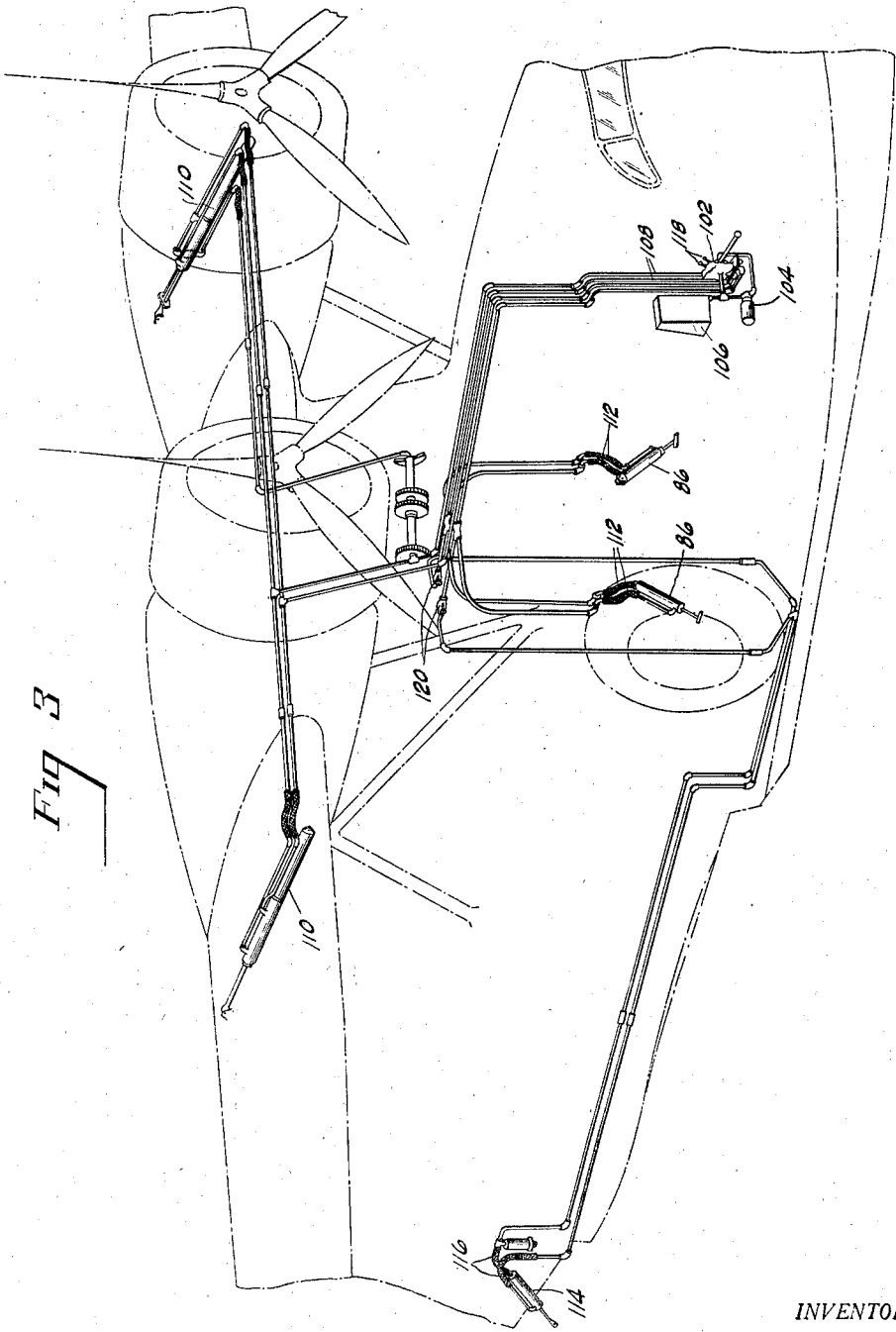

Patented May 2, 1939

2,156,773

UNITED STATES PATENT OFFICE 2,156,773

RETRACTABLE LANDING GEAR

Igor I. Sikorsky, Trumbull, Conn., assignor to United Aircraft Corporation, East Hartford, Conn., a corporation of Delaware Application May 14, 1936, Serial No. 79,643

6 Claims. (Cl. 244—102)

This invention relates to improvements in retractable landing gears for airplanes and has for an object the provision of a landing gear arranged to support the airplane upon a pair of wheels by means of compressible shock struts when the landing gear is in use, and to fold the landing gear including the larger portions of the wheels into suitable recesses provided in the body of the airplane when the landing gear is retracted.

A further object resides in the provision of a landing gear of the character described so arranged that its elements may be folded into recesses of restricted dimensions provided in opposite sides of the body or hull of the airplane.

A still further object resides in the provision of an independent hydraulically actuated operating device for moving the landing gear between its operative and inoperative positions.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the idea of the invention. The drawings, however, are for the purpose of illustration only and are not to be taken as limiting the invention, the scope of which is to be measured entirely by the scope of the appended claims.

In the drawings, Figure 1 is a transverse sectional view through the airplane body in the region of the landing gear and shows two opposite halves of the body, one half with the landing gear extended, and the other half with the landing gear retracted.

Fig. 2 is a side elevational view of one of the landing gear devices illustrated in Fig. 1.

Fig. 3 is a partly schematic perspective view of a fragmentary portion of an airplane showing the connections for supplying hydraulic power to the landing gear operating devices.

Referring to the drawings in detail the numeral 4 generally indicates the body of the airplane which may be the hull of a flying boat as illustrated, or may be the fuselage of a land plane, as the retractable landing gear forming the subject matter of this invention is adaptable for use with any type of airplane having a wing supported body, hull, or fuselage.

In the airplane construction illustrated, the hull 4 is provided at spaced intervals with reinforced transverse bulkheads or partitions 6. Preferably, one such bulkhead is located at each side of the recess 8 provided for the reception of the landing gear when retracted. Wall members 10 and 12 extend between these bulkheads to provide internal walls for the recesses and curved or dished members 14 are inserted in the external walls 16 to provide receptacles for the wheels 18, the members 14 being provided with slots or apertures through which the members connecting the wheels and the body extend. The bulkheads are provided with suitable reinforcing elements as indicated at 20, 22, 24 and 26, and between the ends of these members suitable bearing members extend along the walls 10 and 12 for pivotally supporting the body connected ends of the elements connecting the wheels with the body.

Each of the wheels 18 is rotatably mounted upon an axle member generally indicated at 28 which has a horizontally disposed spindle portion 30 extending into the hub of the wheel and a substantially vertical stem portion 32 disposed at right angles to the spindle portion 30. A compressible shock strut member generally indicated at 34 is pivotally connected to the upper end of each stem 32 by a suitable bearing 36 and extends upwardly into the respective body recesses to pivotal connections 38 between the upper end of the member and suitable bearing members carried by one set of reinforcing members such as the reinforcing members 26.

Each shock strut 34 preferably includes in general a lower leg member 40, the lower end of which is provided with a suitable connection for the bearing 36 and the upper end of which extends into a hydraulic cylinder 42 and carries a piston reciprocally disposed in the cylinder. This piston may be urged downwardly by a coiled compression spring, the action of which may be damped by hydraulic fluid in a manner well-known to the art. Above the cylinder 42 there is provided an upper leg member of substantially V form comprising a pair of diverging tubular elements 44 and 46 provided at their upper ends with connections for the bearing or bearings 36. At their lower ends the members 44 and 46 are connected into a base 48 and near their upper ends they are connected by a transverse brace member 50. The base member 48 is separate from the cylinder 42 and is connected to the cylinder by means of an off-set hinge 52 to provide a knee joint in the strut so that the strut may be folded in one direction upon breaking the joint, but will be locked against movement in the opposite direction.

Extending from the stem 32 to the lower portion of the recess 8, are a pair of guide members generally indicated at 54 and 56. The upper guide member 54 includes a pair of diverging tubular members 58 and 60 secured at their lower ends to a stirrup member 62 which is pivotally secured to the bearing 36 by means of the through bolt 64 which also pivotally connects the lower leg 40 of the hydraulic strut to the upper end of the stem 32. At their upper ends the members 58 and 60 are pivotally secured to a bearing or bearings 66 supported upon suitable reinforcing members such as the reinforcing members 22.

The lower guide member 56 includes a pair of tubular elements 68 and 70 pivotally secured at their lower ends to the ends of a transverse bearing member 72 which is rigidly secured to the stem 32 intermediate its length and braced to the stem by suitable reinforcing members 74 and 76. Adjacent to their upper ends the tubular members 68 and 70 are preferably connected by means of a cross member 78 and are provided at their extreme upper ends with suitable connections for the bearing or bearings 80 supported by suitable reinforcing members such as the members 20 for pivotally connecting the upper end of the lower guide member 56 to the airplane body.

The respective lengths of the guide members 54 and 56, and the locations of the bearings 66 and 80, the bearing 36, and transverse bearing 72 are so related that when the landing gear is retracted the wheel 18 will move from its substantially vertical operative position illustrated on the right hand side of Figure 1 to its substantially vertical retracted position illustrated on the left hand side of Figure 1 in which a material portion of the wheel is received in the dished member 14.

In the type of airplane body or hull illustrated, a central passageway 82 is provided between the recesses 8 which means that except in the case of extremely large ships the recesses 8 are necessarily so restricted in dimensions that the landing gear elements must be folded into an extremely compact arrangement in order to retract the landing gear elements into the available limits of the recesses. In order to accomplish this purpose, as the landing gear is retracted the upper leg of the strut 34 is folded downwardly, the lower leg 40 and the cylinder 42 are reversed in position and the stem 32 is brought into a vertical position substantially parallel to and coterminous with the upper leg of the strut, thus bringing the strut and the axle stem into a substantially N-shaped relationship. The lower guide member 56 becomes vertically parallel to and substantially coincident with the stem 32 and the upper guide member becomes substantially parallel to the lower leg 40 and cylinder 42 of the supporting shock strut, thus providing an extremely compact folding of the various elements extending between the wheel and the body.

The body supporting elements are brought into the compact folded relation described above by means of a special landing gear retracting and extending mechanism generally indicated at 84.

The mechanism 84 is preferably a hydraulically or pneumatically actuated expansible chamber or cylinder and piston device, the form illustrated being a piston and cylinder device having a cylinder 86 pivotally connected at its upper end to the cross bar 50 extending between the upper portions of the tubular elements 44 and 46 of the upper leg of the shock strut and a piston rod 88 slidably received in the lower end of the cylinder and carrying at its lower end a T shaped cross head 90. The cross head 90 is operatively connected to the strut 34 adjacent to the hinged joint 52 thereof by means of a set of links pivotally connected to the strut and to the cross head. In the form of the invention illustrated, there are four such links indicated at 92, 94, 96, and 98, the links 92 and 94 being disposed upon one side of the strut and the links 96 and 98 being disposed upon the opposite side thereof. The two links 92 and 96 are pivotally connected at their lower ends to the cylinder portion 42 of the strut by means of suitable bearings carried upon the reinforcing annular band 100, and the links 94 and 98 are pivotally connected at their upper ends by means of suitable bearings to the respective tubular leg members 44 and 46. At their adjoining ends the link members 96 and 98 are pivotally connected to one end of the T shaped cross head 90 and the link members 92 and 94 are pivotally connected to the opposite end of the cross head by means of suitable pivotal bearings. The lengths of the upper and lower links and their connections with the strut member are so related that the cross head is disposed above the upper side of the strut member and a short distance on the wheel side of the hinge 52.

The piston rod 88 is provided on its upper end within the cylinder 86 with a suitable piston reciprocable in the cylinder and the cylinder is provided with suitable hydraulic connections so that fluid under pressure may be supplied to the space between either end of the cylinder and the corresponding end of the piston to cause the piston rod to move in either direction as desired with respect to the cylinder.

From the illustration of the drawings and the above description, it will be noted that the landing gear extending and retracting mechanism is connected to the cylinder and upper leg of the strut and is entirely independent of the movable or lower leg 40 of the strut so that the strut can perform its function of absorbing shocks imparted to the respective wheel without in any way affecting the extending and retracting mechanism, and the extending and retracting mechanism can perform its function of extending and retracting the landing gear without in any way affecting the relation between the lower leg 40 and the cylinder 42.

In the above described relationship of the various elements, if it is desired to retract the landing gear from the extended position illustrated in the right of Figure 1 to the retracted position illustrated at the left of Figure 1, hydraulic fluid will be supplied to the space between the lower end of the cylinder 86 and the corresponding end of the included piston to exert a force to cause the rod 88 to move upwardly into the cylinder. This force acting upon the links 92, 94, 96 and 98 will first break the hinged joint 52 in the strut 34, and upon continued movement will cause the upper leg member of the strut to swing downwardly toward a vertical position and the cylinder and lower leg to swing to an inverted position and lift the axle 28 upwardly and inwardly into the recess. The guide members 54 and 56 will, of course, follow the movements of the axle and swing into the recess so that when the landing gear is retracted the entire landing gear mechanism, with the possible exception of a portion of the outer side of the wheel, will be withdrawn into and completely enclosed in the respective recesses 8.

When it is desired to extend the landing gear from the retracted position illustrated at the left of Figure 1 to the extended position illustrated at the right of this figure, hydraulic fluid under pressure will be supplied to the space between the upper end of the cylinder 86 and the corresponding end of the piston. The pressure of this hydraulic fluid will force the rod 88 outwardly with respect to the piston and cause the cross head 90 to exert a force upon the links connecting the cross head with the strut 34 which will swing the cylinder and lower leg 40 of the strut from its inverted to its upright position and will move the wheel and guide members out of the recess and to the extended position, thus bringing the upper and lower portions of the strut to their operative aligned condition. The cross head 90 is always located at a distance from the hinge 52 so that a force exerted upon the cross head by the piston rod 88 may utilize this distance as a lever arm to swing the upper and lower portions of the shock strut about the hinge which may be regarded as the instantaneously fixed center of movement of the two portions of the strut. By means of this arrangement the landing gear mechanism may be folded into an excessively compact arrangement and may be moved from one to the other of its two positions by the exertion of an extremely small force on the piston carried by the piston rod 88.

The above described arrangement also permits the use of an extremely simple and compact device for supplying the necessary force to the cross head. As illustrated in Fig. 3, the mechanism comprises a pump 102 which may be motor or hand operated, depending upon the sides and nose of the airplane upon which the apparatus is mounted. In the form illustrated, for the sake of safety, two pumps are provided; namely, the hand operated pump 102 and the motor operated pump 104. Both of these pumps lead from a fluid reservoir 106 to a plurality of pressure lines 108 connected with various adjustable elements of the airplane so that the same set of pumps may be utilized to serve purposes in addition to the purpose of extending and retracting the landing gear. In the form illustrated, some of the pressure lines lead to hydraulic mechanisms 110 which are used to operate the wing flaps on the airplane, and it is obvious that the pump pressure might also be utilized to operate the airplane control surfaces if desired. Others of the pressure lines 108 lead to the cylinder 86 for operating the retractable landing gear and are operatively connecting with the cylinders by suitable flexible connections 112. Other lines may also be led to a suitable hydraulic mechanism 114 for operating the tail wheel of the landing gear and connected to this mechanism by suitable flexible connections 116. The various pressure lines are provided with suitable manually operable valves as indicated at 118 so that the various elements connected with the pressure pumps may be operated at will and may also be provided with suitable cut-off valves 120 by means of which certain of the pressure lines may be rendered inoperative during periods in which the operation is not desired.

While there has been illustrated and describd a particular mechanical embodiment of the idea of the invention and two somewhat modified forms thereof, it is to be understood that the invention is not limited to the particular embodiments so illustrated and described, but that such changes in the size, shape, and arrangement of parts may be resorted to as come within the scope of the sub-joined claims.

Having now described the invention so that others skilled in the art may clearly understand the same, what it is desired to secure by Letters Patent is as follows.

What is claimed is:

1. In an airplane or the like, a body, an undercarriage having a jointed strut, an offset hinge on the joint of the strut to permit a folding movement thereof, a wheel carrying axle pivotally connected to the lower end of said strut, a recess in said body, brace members pivotally connected to spaced points on said axle and to said body adapted to guide said wheel into said recess, means independent of said hinge connecting the two parts of said jointed strut; and means acting upon said connecting means for retracting said landing gear, into said recess, the relative length of said strut portions and the positions of the pivot points of said strut and braced members being such that breaking of the hinge joint and retracting said landing gear will reverse the position of the portion of said strut between said hinge joints and said axle.

2. In an airplane, a body having recesses therein, a wheeled undercarriage attached to the body, a jointed compression member pivotally connected to said body at one end and having an offset hinge intermediate its length extending from said body to said wheel, means for folding said member into a recess comprising, links pivotally secured to the two portions of said jointed member on opposite sides of said offset hinge and pivotally connected together, and an expansible chamber device pivotally connected at one end to the connection between said links and pivotally connected at its opposite end to one of the portions of said jointed member at a point remote from said hinge.

3. In an airplane, a body having recesses therein, a wheel adjacent to each recess for supporting said body, a jointed compression strut having an offset hinge extending from said body to said wheel, means for raising said wheel and retracting said strut into said recess comprising, a pair of links pivotally connected to each portion of said strut on opposite sides of said hinge, a pivotal connection between said links above said hinge, a hydraulic expansible and retractable device pivotally connected at one end to the pivotal connection between said links and at its opposite end to said strut at a point remote from said hinge to break said joint and move said strut into said recess, and a manually controllable supply of hydraulic fluid for operating said hydraulic device.

4. In an airplane, a body having recesses therein, a jointed compression strut pivotally connected to said body within said recess at its upper end and having a joint with an offset hinge intermediate its length, a wheel carrying axle pivotally connected to the lower end of said strut, guide members extending from said axle to said body within said recess, means for retracting said strut, guide members and axle into said recess comprising, links pivotally connected to the portions of said strut on opposite sides of said hinge and pivotally connected together above said hinge, and an expansible chamber device connected at one end to said links and at the other end to the upper portion of said strut.

5. In an airplane, a body having recesses therein, and a landing gear retractable into said recesses comprising jointed compression struts pivotally connected at one end to said body within said recesses, each strut having a joint provided with an offset hinge intermediate its length, a wheel carrying axle pivotally secured to the lower end of each strut, guide members extending between said axles and said body within said recesses, and means carried by and supported solely upon said struts for breaking said strut hinge joints, the relative length of said strut portions and the positions of said pivot points of said strut and braced members being such that breaking of the hinge joint and retracting said landing gear will reverse the position of the portion of said strut between said hinge joint and said axle.

6. In an airplane, a body having a central passageway and a restricted recess therein upon each side of said passageway, and a retractable landing gear for said airplane comprising, a jointed compression strut pivotally connected at its upper end to said body within the upper portion of each recess and pivotally connected at its lower end to a wheel carrying axle, said strut having a joint provided with an offset hinge, guide members extending between each axle and said body within the lower portion of said recesses, and expansible chamber means carried by each strut and acting on said hinged joints to break said offset hinge joints and retract said landing gear to a substantially N shaped arrangement within the confines of the respective recesses, the relative length of said strut portions and the positions of the pivot points of said strut and braced members being such that breaking of the hinge joints and retracting said landing gear will reverse the positions of the portions of said struts between said hinge joints and said axles.

IGOR I. SIKORSKY.